US006867951B1

(12) United States Patent
Kula

(10) Patent No.: US 6,867,951 B1
(45) Date of Patent: Mar. 15, 2005

(54) SPIN VALVE MAGNETIC PROPERTIES WITH OXYGEN-RICH NIO UNDERLAYER

(75) Inventor: Witold Kula, Cupertino, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 0 days.

(21) Appl. No.: 09/614,945

(22) Filed: Jul. 12, 2000

(51) Int. Cl.$^7$ ................................................. G11B 5/39
(52) U.S. Cl. ................................................... 360/324.1
(58) Field of Search ........................ 360/324.1–324.12

(56) References Cited

U.S. PATENT DOCUMENTS

| | | | |
|---|---|---|---|
| 5,432,734 A | 7/1995 | Kawano et al. | 365/158 |
| 5,514,469 A | 5/1996 | Shinjo et al. | 428/332 |
| 5,780,176 A | 7/1998 | Iwasaki et al. | 428/692 |
| 5,783,262 A | 7/1998 | Chaiken et al. | 427/529 |
| 5,849,422 A | 12/1998 | Hawashi | 428/611 |
| 5,871,622 A | 2/1999 | Pinarbasi | 204/192.11 |
| 6,292,336 B1 * | 9/2001 | Horng et al. | 360/324.12 |
| 6,770,382 B1 * | 8/2004 | Chang et al. | 428/632 |

FOREIGN PATENT DOCUMENTS

| | | | |
|---|---|---|---|
| JP | 8235540 | 9/1996 | G11B/5/39 |
| JP | 0927103 | 1/1997 | G11B/5/39 |
| JP | 10049830 | 2/1998 | G11B/5/39 |
| JP | 10303477 | 11/1998 | H01L/43/08 |

OTHER PUBLICATIONS

Lai, C et al., *Anisotropic Exchange for NiFe Films Grown on Epitaxial NiO*, IEEE Trans. Mag., vol. 31, No. 6, Nov. 1995, pp. 2609–2611.

Nakatani, R., et al., *Magnetoresistive in Fe–Mn/Ni–Fe–Co/CO/Cu/Co/Ni–Fe–Co Sandwiches with NiO or NiO/Hf Buffer Layer*, Mat. Trans, JIM, vol. 37, No. 9, 1996, pp. 1458–1463.

* cited by examiner

Primary Examiner—A. J. Heinz
(74) Attorney, Agent, or Firm—Lumen Intellectual Property Services

(57) ABSTRACT

In a spin valve, an underlayer is made of oxygen-rich nickel oxide to enhance the giant magnetoresistive ratio ($\Delta R/R$). The oxygen-rich nickel oxide film is made using reactive sputtering of a nickel target in an oxygen-rich sputtering atmosphere consisting substantially of pure oxygen and argon gases. The total pressure of the oxygen-rich atmosphere is reduced during the oxygen-rich nickel oxide film formation to additionally enhance the $\Delta R/R$ value. A spin valve including two adjacent oxygen-rich nickel oxide underlayers provides a higher $\Delta R/R$ ratio at a given pinning strength $H_{ua}$ than does a spin valve having only one oxygen-rich nickel oxide underlayer.

22 Claims, 3 Drawing Sheets

SPIN VALVE MAGNETIC PROPERTIES WITH OXYGEN-RICH NIO UNDERLAYER

FIELD OF THE INVENTION

This invention relates generally to a magnetoresistive sensor. More particularly, it relates to improved spin valve magnetic properties with an engineered NiO underlayer.

BACKGROUND ART

A spin valve or a giant magnetoresistive (GMR) sensor detects magnetic field signals through the resistance changes of a read element, fabricated of a magnetic material, as a function of the strength and direction of magnetic flux being sensed by the read element. A conventional magnetoresistive sensor operates on the basis of the anisotropic magnetoresistive (AMR) effect in which a component of the read element resistance varies as the square of the cosine of the angle between the magnetization in the read element and the direction of sense current flow through the read element. Recorded data can be read from a magnetic medium, because the external magnetic field from the recorded magnetic medium (the signal field) causes a change in the direction of magnetization in the read element, which in turn causes a change in magnetoresistive ratio ($\Delta R/R$) in the read element.

A spin valve or a GMR sensor has been identified in which the resistance between two uncoupled ferromagnetic layers is observed to vary as the cosine of the angle between the magnetizations of the two layers and is independent of the direction of current flow. The latter spin valve produces a magnetoresistance that, for selected combinations of materials, is greater in magnitude than the AMR. Typically, the higher GMR ratio ($\Delta R/R$) results in higher amplitude and better overall performance of the spin valve recording heads.

Typically, a conventional spin valve includes a ferromagnetic free layer, a ferromagnetic pinned layer, which is exchange-coupled with an antiferromagnetic (AF) layer, and a spacer layer located between the free layer and the pinned layer. Often an underlayer of metal, such as Ta, Zr, and Cu, or metal oxide, such as NiO and NiMnOx, is applied to enhance the $\Delta R/R$ ratio of the spin valve. Antiferromagnetic layers shift the hysteresis loops of ferromagnetic films away from the zero field axis. The shift brings the most sensitive part of the magnetoresistive loop close to zero field.

However, the underlayers of spin valves made by the prior art do not optimize the $\Delta R/R$ ratio of the spin valve. Furthermore, the spin valves of the prior art do not optimize the pinning strength, which is the external field applied to a spin valve enough to unpin the magnetization of the pinned layer. Typically, the higher the pinning field is, the better is the spin valve's performance. The desirable value of pinning strength is typically above 400 Oe. The same mechanisms that increase spin valve $\Delta R/R$ often lower its pinning strength $H_{ua}$. Spin valves of the prior art cannot balance high values of $\Delta R/R$ and high pinning strength to improve the performance of spin valves.

There is a need, therefore, for a spin valve structure that improves spin valve magnetic properties.

OBJECTS AND ADVANTAGES

Accordingly, it is a primary object of the present invention to provide a structure for a spin valve that:

1) can optimize the GMR ratio ($\Delta R/R$) of the spin valve;
2) can optimize the pinning strength; and
3) can balance the GMR ratio and the pinning strength.

These and other objects and advantages will be apparent upon reading the following description and accompanying drawings.

SUMMARY

These objects and advantages are attained by a spin valve that detects an external magnetic field with the aid of non-stoichiometric oxygen-rich nickel oxide underlayers containing substantially more than 50 atomic % (at. %) of oxygen, typically 55 at. % or more.

A spin valve typically includes a ferromagnetic free layer, a ferromagnetic pinned layer, and an antiferromagnetic layer coupled with the ferromagnetic pinned layer. A nonmagnetic spacer layer is disposed between the ferromagnetic free layer and the ferromagnetic pinned layer. The spin valve further includes an underlayer to enhance the giant magnetoresistive ratio ($\Delta R/R$). In accordance with a first embodiment of the present invention, the underlayer of a spin valve is an oxygen-rich nickel oxide layer, which is made using reactive sputtering of a nickel target in an oxygen-rich atmosphere consisting substantially of pure oxygen and inert gases, typically argon gas. An oxygen/argon ratio higher than 1:10 typically produces an underlayer of oxygen-rich nickel oxide with more than 55 at. % of oxygen that improves the $\Delta R/R$ value of a spin valve. The thickness of the oxygen-rich nickel oxide layer is typically between about 20 Å (2 nm) and about 400 Å (40 nm). Additional enhancement of the $\Delta R/R$ value of a spin valve is achieved by reducing the total pressure of the atmosphere consisting of pure oxygen and argon during the oxygen-rich nickel oxide film formation. This spin valve structure provides a value of $\Delta R/R$ between about 7% and about 9%.

According to a second embodiment of the present invention, the underlayer of a spin valve is a pseudo-dual layer, in other words the spin valve has two adjacent nickel oxide underlayers with a total thickness between about 20 Å and about 400 Å. Either or both of these two nickel oxide underlayers are oxygen-rich nickel oxide layers. Two nickel oxide underlayers are made using a sputtering method similar to the method described in connection with the first embodiment. The oxygen content differs between the two nickel oxide underlayers. Proper selection of the oxygen content and thickness of each of the two nickel oxide underlayers results in a higher $\Delta R/R$ ratio with a given pinning strength ($H_{ua}$), or higher $H_{ua}$ with a given $\Delta R/R$ ratio than those achieved with a spin valve including only one oxygen-rich nickel oxide underlayer. This spin valve structure provides a value of $\Delta R/R$ between about 7% and about 9%.

Since the increase in $\Delta R/R$ ratio is generally accompanied by decrease in the pinning strength $H_{ua}$, a second embodiment of the present invention is particularly useful in balancing the ΔR/R and $H_{ua}$ values, in cooperation with other factors increasing $H_{ua}$, such as the selection of materials for pinned and pinning layer in a spin valve.

According to a third embodiment of the present invention, spin valves of the types depicted in the first and second embodiments are incorporated in read/write heads used in disk drive systems. A disk drive system includes a magnetic recording disk, the read/write head, an actuator for moving the read/write head across the magnetic recording disk, and a motor for spinning the disk.

DETAILED DESCRIPTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

Figure 1:
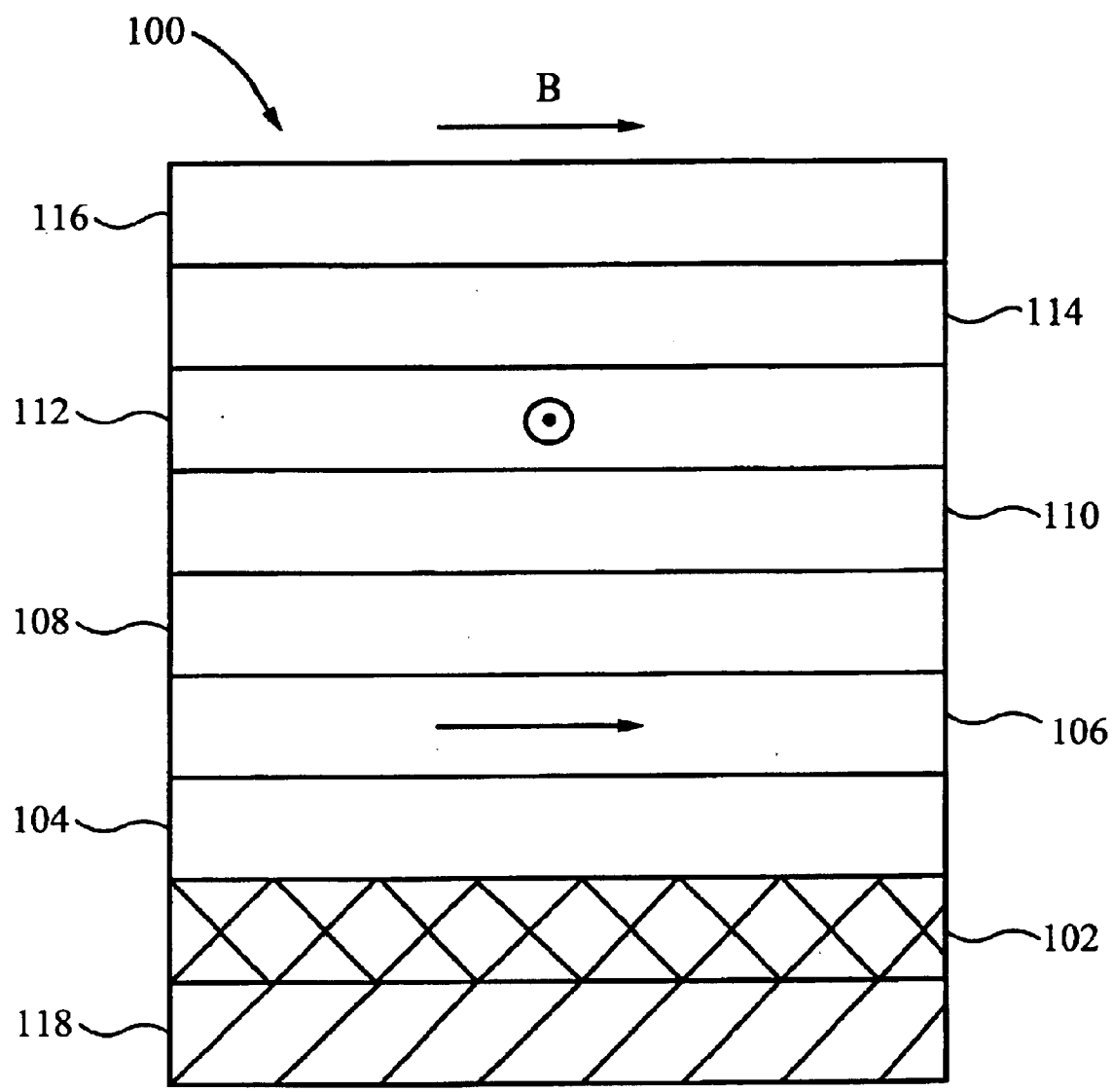
FIG. 1 is a cross-sectional schematic diagram of a spin valve with an oxygen-rich nickel oxide underlayer, according to an embodiment of the present invention.

FIG. 1 is a cross-sectional schematic diagram of a spin valve 100, according to an embodiment of the present invention. Spin valve 100 includes a ferromagnetic free layer 106 contacting a nanolayer 108, a ferromagnetic pinned layer 112, and an antiferromagnetic (AF) layer 114 contacting with ferromagnetic pinned layer 112. A first nonmagnetic spacer layer 110 is disposed between nanolayer 108 and ferromagnetic pinned layer 112. Spin valve 100 further includes an underlayer 102, and a second nonmagetic spacer layer 104 disposed between ferromagnetic free layer 106 and underlayer 102. A protective cap layer 116 is located on top of spin valve 100, contacting with AF layer 114. Spin valve 100 is deposited on top of a substrate 118.

Cap layer 116 typically includes Ta. AF layer 114 is typically made of a material containing Mn. Ferromagnetic pinned layer 112 typically includes Co or Cobalt alloys. Nonmagnetic spacer layers 110 and 104 are typically made of Cu, Ag, Au or their alloys. Nanolayer 108 typically includes Co or cobalt alloys. Ferromagnetic free layer 106 typically includes a material containing Ni, Fe, Co or alloys of Ni, Fe and Co such as NiFe, NiCo, NiCoFe and FeCo.

To improve the ΔR/R ratio of spin valve 100, underlayer 102 is made of oxygen-rich nickel oxide, and has a thickness of between about 20 Å (2 nm) and about 400 Å (40 nm). Oxygen-rich nickel oxide underlayer 102 is made using reactive sputtering of a nickel target in an oxygen-rich atmosphere consisting substantially of pure oxygen and an inert gas, typically argon. For the typically used gas pressure of about 2 mTorr and nickel oxide film growth rate of about 0.5 Å/s, the oxygen/argon ratio must be higher than 1:10 to achieve an oxygen-rich nickel oxide underlayer 102 that provides a ΔR/R ratio of spin valve 100 between about 7% and about 9%. The content of oxygen in oxygen-rich nickel oxide underlayer 102 is typically between about 55 at. % and about 65 at. %.

An example is given below to show the effect of the oxygen-rich nickel oxide underlayer on the ΔR/R ratio. A spin valve with a complete structure denoted by NiO/Cu/NiFe/CoFe/Cu/Co/NiMn/Ta, includes an underlayer of NiO, a first nonmagnetic spacer layer of Cu, a ferromagnetic free layer of NiFe, a nanolayer of CoFe, a second nonmagnetic spacer layer of Cu, a ferromagnetic pinned layer of Co, an AF layer of NiMn, and a cap layer of Ta. Table 1 below shows the improvement of the spin valve GMR ratios (ΔR/R) with nickel oxide underlayers formed in increasingly oxygen-rich atmospheres. In table 1, the ΔR/R ratios are optimized with desirable values of pinning strengths $H_{ua}$, which are the external fields applied that are enough to unpin the magnetization of the pinned layer, and the coupling strengths $H_f$, which shift the hysteresis loops of the ferromagnetic free layer away from a zero field axis.

TABLE 1

| Oxygen flow (sccm) | Argon flow (sccm) | ΔR/R (%) | $H_f$ (Oe) | $H_{ua}$ (Oe) |
|---|---|---|---|---|
| 10 | 50 | 7.9 | 11.9 | 780 |
| 30 | 30 | 8.5 | 9.6 | 701 |
| 50 | 10 | 8.7 | 9.3 | 598 |

As shown in table 1, the value of ΔR/R increases as the oxygen/argon ratio increases. Additional enhancement of the oxygen-rich NiO properties as an underlayer is achieved by reducing the total pressure of the oxygen-rich atmosphere during the oxygen-rich NiO film formation. For example, with an oxygen/argon flow ratio of 20 sccm/40 sccm respectively, the ΔR/R value increases from about 8.2% to about 8.5% as the total pressure is reduced from about 2 mTorr to about 1 mTorr.

Figure 2:
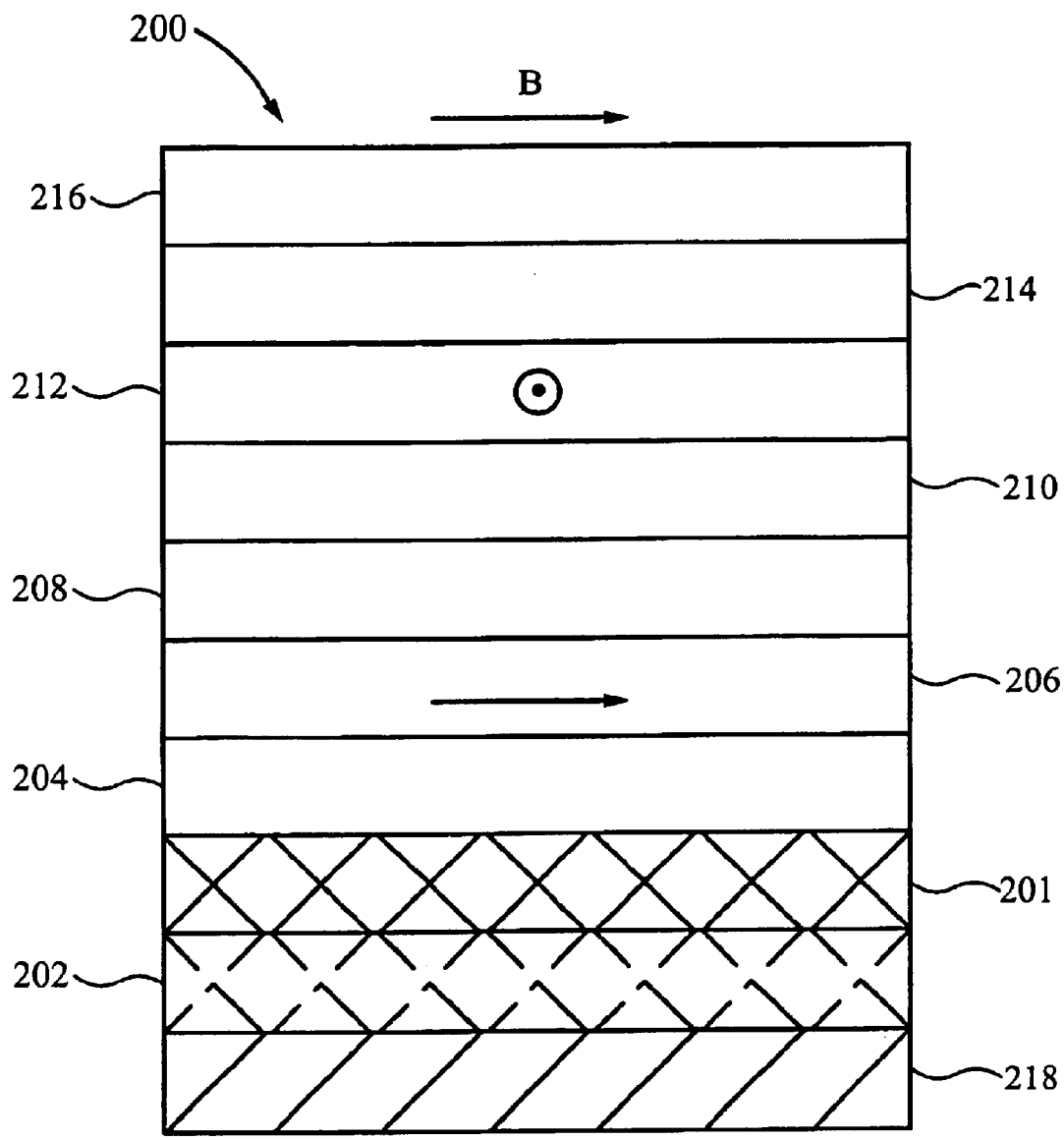
FIG. 2 is a cross-sectional schematic diagram of a spin valve with two nickel oxide underlayers, according to another embodiment of the present invention.

FIG. 2 is a cross-sectional schematic diagram of a spin valve 200 according to a second embodiment of the present invention. The basic structure of spin valve 200 is similar to the basic structure of spin valve 100 of FIG. 1. Spin valve 200 includes a ferromagnetic free layer 206 contacting a nanolayer 208, a ferromagnetic pinned layer 212, and an antiferromagnetic (AF) layer 214 contacting ferromagnetic pinned layer 212. A first nonmagnetic spacer layer 210 is disposed between nanolayer 208 and ferromagnetic pinned layer 212. Spin valve 200 further includes a first underlayer 201, a second underlayer 202, and a second nonmagetic spacer layer 204 disposed between ferromagnetic free layer 206 and first underlayer 201. A cap layer 216 is located on top of spin valve 200, contacting AF layer 214. Spin valve 200 is deposited on top of a substrate 218. Typically, the materials of each layer in spin valve 200 are similar to those of the corresponding layers in spin valve 100 of FIG. 1.

Two underlayers 201 and 202 of spin valve 200 are made of nickel oxide, and are made with a sputtering method similar to the sputtering method described above in connection with the first embodiment. Either or both of two underlayers 201 and 202 are oxygen-rich nickel oxide layers. The total thickness of two underlayers 201 and 202 is between about 20 Å (2 nm) and about 400 Å (40 nm). The content of oxygen in first underlayer 201 is typically different from the content of oxygen in second underlayer 202. The oxygen content in first nickel oxide underlayer 201 is typically between about 50 at. % and about 60 at. %, and the oxygen content in second nickel oxide underlayer 202 is typically between about 55 at. % and about 65 at. %, or vice versa.

Proper selection of the oxygen contents and thicknesses of two nickel oxide underlayers 201 and 202 of spin valve 200 leads to a higher ΔR/R ratio with a given pinning strength or a higher pinning strength with a given ΔR/R ratio than those achieved with spin valve 100 described above. The ΔR/R ratio of spin valve 200 is between about 7% and about 9%. Table 2 below illustrates a case in which both ΔR/R ratio and pinning strength $H_{ua}$ of a spin valve are improved with a desirable value of coupling strength $H_f$, using spin valve structure 200 with first nickel oxide underlayer 201 having higher oxygen content than second nickel oxide underlayer 202.

TABLE 2

| Bottom NiO (lower oxygen content) underlayer thickness (Å) | Top NiO (higher oxygen content) underlayer thickness (Å) | ΔR/R (%) | $H_f$ (Oe) | $H_{ua}$ (Oe) |
| --- | --- | --- | --- | --- |
| 53 | 67 | 8.7 | 10.8 | 719 |

Since the increase in ΔR/R ratio is accompanied by a decrease in the pinning strength $H_{ua}$ in both embodiments, this embodiment of the present invention is particularly useful in balancing the ΔR/R ratios and $H_{ua}$ pinning strength, in cooperation with other factors increasing $H_{ua}$, such as the selection of materials for each spin valve layer.

Figure 3:
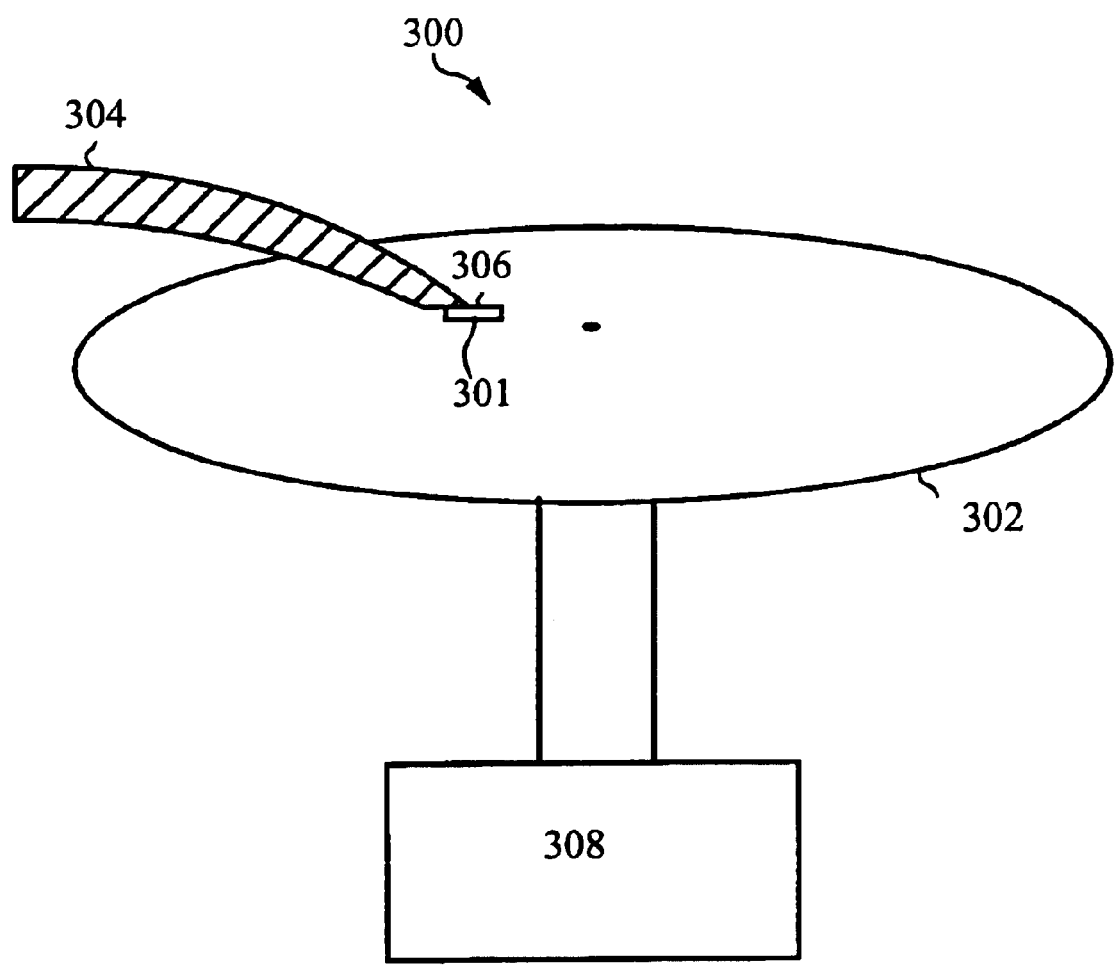
FIG. 3 is a schematic diagram of a disk drive system according to a third embodiment of the present invention.

Spin valves of the types described above with respect to FIGS. 1 and 2 are incorporated in read/write heads used in disk drive systems 300 as shown in FIG. 3 according to a third embodiment of the present invention. The disk drive system 300 generally comprises a magnetic recording disk 302, a read/write head 306 containing a spin valve 301, an actuator 304 connected to the read/write head 306, and a motor 308 connected to the disk 302. The motor 308 spins the disk 302 with respect to read/write head 306. The actuator 304 moves the read/write head 306 across the magnetic recording disk 302 so the read/write head 306 may access different regions of magnetically recorded data on the magnetic recording disk 302.

It will be clear to one skilled in the art that the above embodiments may be altered in many ways without departing from the scope of the invention. Accordingly, the scope of the invention should be determined by the following claims and their legal equivalents.

What is claimed is:
1. A spin valve comprising:
   a) an antiferromagnetic layer;
   b) a ferromagnetic pinned layer having a magnetization pinned by the antiferromagnetic layer;
   c) a ferromagnetic free layer;
   d) a nonmagnetic spacer layer located between the free layer and the pinned layer such that the pinned layer controls a magnetization of the free layer; and
   e) a first underlayer in proximity to the free layer and having a thickness between about 2 nm and about 40 nm;

wherein the first underlayer comprises an oxygen-rich nickel oxide.

2. The spin valve of claim 1, wherein the first underlayer has a first oxygen content sufficient to raise a magnetoresistive ratio (ΔR/R) of the spin valve to between about 7% and about 9%.

3. The spin valve of claim 1 wherein the content of oxygen in the first underlayer is between about 55 atomic % and about 65 atomic %.

4. The spin valve of claim 1, further comprising a second nickel oxide underlayer adjacent to the first underlayer.

5. The spin valve of claim 4, wherein the second nickel oxide underlayer is an oxygen-rich nickel oxide underlayer.

6. The spin valve of claim 5, wherein the content of oxygen in the first underlayer is different from the content of oxygen in the second nickel oxide underlayer.

7. The spin valve of claim 6, wherein the content of oxygen in the second nickel oxide underlayer is between about 50 atomic % and about 60 atomic %.

8. The spin valve of claim 5, wherein the combined thickness of the first underlayer and the second nickel oxide underlayer is between about 2 nm and about 40 nm.

9. The spin valve of claim 5, wherein the first underlayer has a first oxygen content and the second nickel oxide underlayer has a second oxygen content sufficient to raise a magnetoresistive ratio (ΔR/R) of the spin valve to between about 7% and about 9%.

10. The spin valve of claim 5, wherein the first underlayer has a first oxygen content and the second nickel oxide underlayer has a second oxygen content sufficient to balance the magnetoresistive ratio ΔR/R and a pinning strength $H_{ua}$.

11. The spin valve of claim 10, wherein the ΔR/R ratio is between about 7% and about 9%, and the value of $H_{ua}$ is between about 800 Oe and about 400 Oe correspondingly.

12. A disk drive system comprising a read/write head containing a spin valve, wherein the spin valve includes:
   a) an antiferromagnetic layer;
   b) a ferromagnetic pinned layer having a magnetization pinned by the antiferromagnetic layer;
   c) a ferromagnetic free layer;
   d) a nonmagnetic spacer layer located between the free layer and the pinned layer such that the pinned layer controls a magnetization of the free layer; and
   e) a first underlayer in proximity to the free layer and having a thickness between about 2 nm and about 40 nm;

wherein the first underlayer comprises an oxygen-rich nickel oxide.

13. The disk drive system of claim 12, wherein the first underlayer has a first oxygen content sufficient to raise a magnetoresistive ratio (ΔR/R) of the spin valve to between about 7% and about 9%.

14. The disk drive system of claim 12, wherein the content of oxygen in the first underlayer is between about 55 atomic % and about 65 atomic %.

15. The disk drive system of claim 12, wherein the spin valve further comprises a second nickel oxide underlayer adjacent to the first underlayer.

16. The disk drive system of claim 15, wherein the second nickel oxide underlayer is an oxygen-rich nickel oxide underlayer.

17. The disk drive system of claim 16, wherein the content of oxygen in the first underlayer is different from the content of oxygen in the second nickel oxide underlayer.

18. The disk drive system of claim 17, wherein the content of oxygen in the second nickel oxide underlayer is between about 50 atomic % and about 60 atomic %.

19. The disk drive system of claim 16, wherein the combined thickness of the first underlayer and the second nickel oxide underlayer is between about 2 nm and about 40 nm.

20. The disk drive system of claim 16, wherein the first underlayer has a first oxygen content and the second nickel oxide underlayer has a second oxygen content sufficient to raise a magnetoresistive ratio ($\Delta R/R$) of the spin valve to between about 7% and about 9%.

21. The disk drive system of claim 16, wherein the first underlayer has a first oxygen content and the second nickel oxide underlayer has a second oxygen content sufficient to balance the $\Delta R/R$ ratio and a pinning strength $H_{ua}$.

22. The disk drive system of claim 21, wherein the $\Delta R/R$ ratio is between about 7% and about 9%, and the value of $H_{ua}$ is between about 800 Oe and about 400 Oe correspondingly.

* * * * *